United States Patent
Michael et al.

(10) Patent No.: US 6,709,009 B1
(45) Date of Patent: Mar. 23, 2004

(54) PASSENGER SIDE MODULE WITH TWO AIRBAGS

(75) Inventors: Dennis Michael, Lakeland, FL (US); Mark Horton, Lakeland, FL (US); Lisa Williams, Branden, FL (US); Favio A. Hiciano, Lakeland, FL (US)

(73) Assignee: Breed Automotive Technology, Inc., Lakeland, FL (US)

(*) Notice: Subject to any disclaimer, the term of this patent is extended or adjusted under 35 U.S.C. 154(b) by 41 days.

(21) Appl. No.: 10/235,569

(22) Filed: Sep. 6, 2002

(51) Int. Cl.⁷ ............................................... B60R 21/24
(52) U.S. Cl. ................................... 280/729; 280/743.1
(58) Field of Search .............................. 280/729, 732, 280/736, 743.1, 728.2

(56) References Cited

U.S. PATENT DOCUMENTS

| | | | | | |
|---|---|---|---|---|---|
| 5,273,309 A | * | 12/1993 | Lau et al. | ................ | 280/730.2 |
| 5,333,899 A | * | 8/1994 | Witte | ....................... | 280/730.2 |
| 5,556,128 A | * | 9/1996 | Sinnhuber et al. | ........ | 280/730.2 |
| 5,681,055 A | * | 10/1997 | Green et al. | ............. | 280/728.2 |
| 5,992,875 A | * | 11/1999 | Cundill | .................... | 280/728.2 |
| 6,036,222 A | * | 3/2000 | Holmes et al. | ........... | 280/728.2 |
| 6,139,052 A | * | 10/2000 | Preamprasitchai | .......... | 280/735 |
| 6,209,909 B1 | * | 4/2001 | Breed | ........................ | 280/735 |
| 2003/0132619 A1 | * | 7/2003 | Winarto et al. | .......... | 280/730.2 |

* cited by examiner

*Primary Examiner*—David R. Dunn
(74) *Attorney, Agent, or Firm*—Jarett Rieger

(57) ABSTRACT

The airbag module has a base plate, two inflators, a top plate and two airbags. The inflators are mounted into the base plate and the airbags are secured to the base plate via top plates. The first airbag has substantially an "L" cross section in its deployed state. The second airbag is adjacent to the first airbag and while both bags are deployed, there is substantially no gap between the first and second airbags.

6 Claims, 2 Drawing Sheets

PASSENGER SIDE MODULE WITH TWO AIRBAGS

FIELD OF THE INVENTION

This invention relates to a vehicle occupant safety restraint for the passenger side and in particular relates to an airbag module capable of deploying two separate airbags.

BACKGROUND OF THE INVENTION

Vehicle inflatable restraints or airbags are deployed in car accidents to help reduce injuries sustained to the occupants. The airbags are stored in an airbag module installed in various parts of the vehicle, such as within the steering wheel or behind the instrument panel. In addition to the airbag module housing an airbag, it also houses an inflator which provides gas for inflating the airbag. When the vehicle undergoes rapid deceleration, as occurs during a head on collision, the airbag rapidly inflates due to the introduction of an inflation gas into the airbag interior.

Traditionally, airbags were designed to protect the $50^{th}$ percentile man who was not out of position. An out of position occupant is one that is not sitting properly in his/her seat, for example, the occupant is leaning toward the front of the car, the occupant has a limb near or touching the instrument panel, etc. Since airbags are aggressively filled, an out of position occupant, an unrestrained occupant, or a child may be injured by contacting the airbag while it is being inflated. There has been much effort in developing a smart airbag system that can detect the size and position of an occupant. These smart airbag systems often require sophisticated airbag designs that has multiple compartments and tethers.

The present invention aims to provide an airbag design that is cheaper and lighter while still having the ability to protect children and out of position occupants.

SUMMARY OF THE INVENTION

An airbag module having one or more inflators, a first airbag, and a second airbag. The first airbag has substantially a "L" cross section in its deployed state. The second airbag is attached to the first airbag by stitching. Three different deployment scenarios are contemplated by the present invention. The first deployment scenario is the deployment of only the first airbag. The second deployment scenario is the deployment of only the second airbag. The last deployment scenario is the deployment of the first and second airbags.

DETAILED DESCRIPTION OF THE INVENTION

Figure 1:
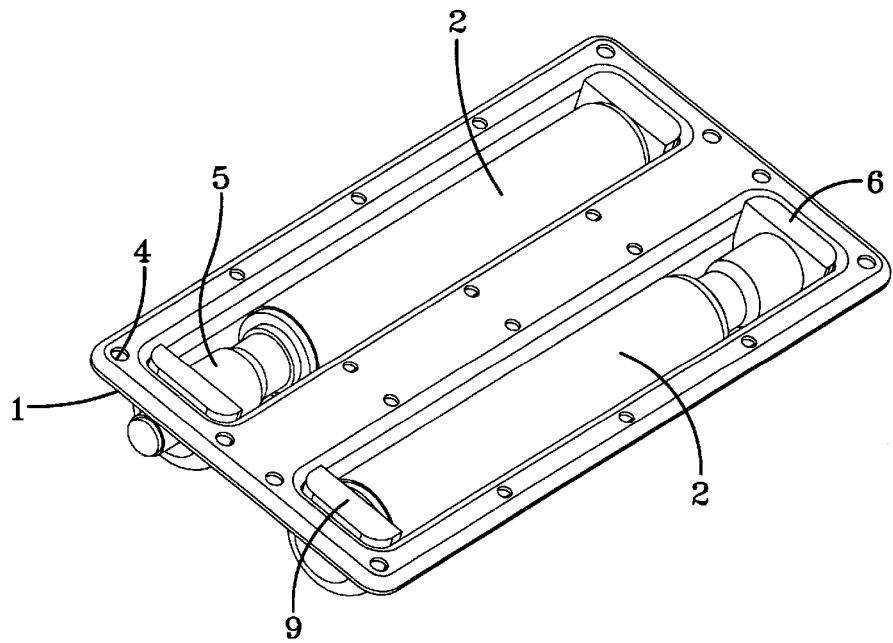
FIG. 1 is a perspective view of a base plate with two inflators.

As seen in FIG. 1, two inflators 2 are mounted into a base plate 1. The base plate 1 serves the purpose of housing the inflators 2 and for directing gas flow from the inflators. The base plate 1 has two cylindrically shaped recesses 3 defining an area for receiving tubular shaped inflators. One skilled in the art appreciates that other shaped recesses 3 can be utilized to accommodate other shaped inflators. The base plate 1 is made from stainless steel, but other suitable materials may be employed such as aluminum, plastics, etc. Around the circumference of the base plate 1 and along the dividing member, there are a plurality of holes 4 for receiving fasteners 20 for fastening the top plate 15 to the base plate 1.

The inflators 2 shown in FIG. 1 have endcap 5 comprising an igniter or squib. The igniter has a socket for receiving an electrical wire from an electronic control unit (not shown), which receives signals from various crash and/or occupant sensors. The inflators 2 represented in FIG. 1 represent a generic inflator and may be a cold gas inflator or a hybrid infaltor. Both of these inflator generally have a tubular shape. The cold gas inflator operates by quickly releasing inflation gas to fill an airbag. On the other hand, the hybrid inflator operates by releasing heated inflation gas to fill an airbag. The gas is heated by burning a heating material that is mixed with the stored gas. Even though not illustrated, other types of inflators may be employed in the present invention namely a pyrotechnic inflator.

The inflators 2 are installed into the base plate 1 by first adding a first retainer 6 to the end cap 5 of the inflator. The first retainer 6 is preferably made from a nylon material. The base plate 1 has one large igniter access slot 7 on each of its side portions for receiving the end caps 5 of the inflators. Each inflator is secured to the base plate 1 by an interference fit created by the incorporation of a second retainer 9 between the bottom end 8 of the inflator and the base plate 1. The second retainer 9 is added after the inflator is dropped into the base plate 1 and slid as far as possible in the direction of the slot 7. The present invention may accommodate inflators 2 of various lengths by utilizing retainers of various thickness. Preferably, the inflators 2 are oriented in opposite directions so that the end cap of one inflator is facing the opposite direction as the end cap from the other inflator. The benefit of mounting the inflators in opposite directions is the avoidance of accidental actuation of an inflator by the other inflator. Even though highly improbable, the heat generated by the actuation of one inflator could ignite pyrotechnic material in the second inflator. Even though not the preferred embodiment, the inflators 2 may be positioned so that they are facing the same direction.

Figure 2:
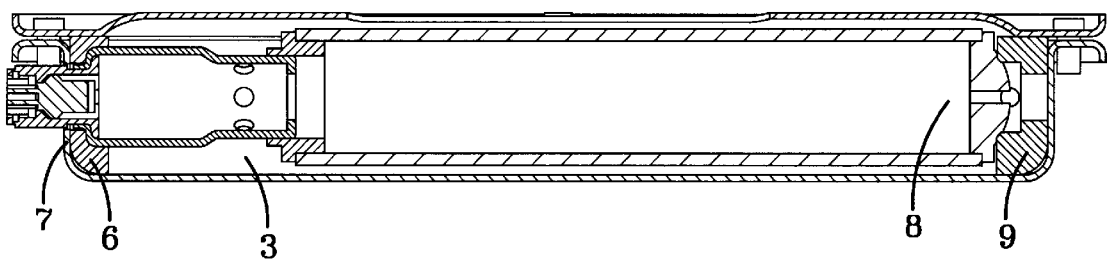
FIG. 2 is a side view of the base plate with an inflator.

FIG. 2 shows a side view of one of the inflators 2 mounted in the base plate 1. As seen in FIG. 2, the retainer 9 abuts both the bottom end 8 of the inflator and the side wall of the base plate 1. The retainer 9 prevents the inflator from sliding back and forth in the base plate 1. As can be seen from FIG. 2, the recesses 3 have a depth so that no portion of the inflator extends above the base plate 1.

Figure 3:
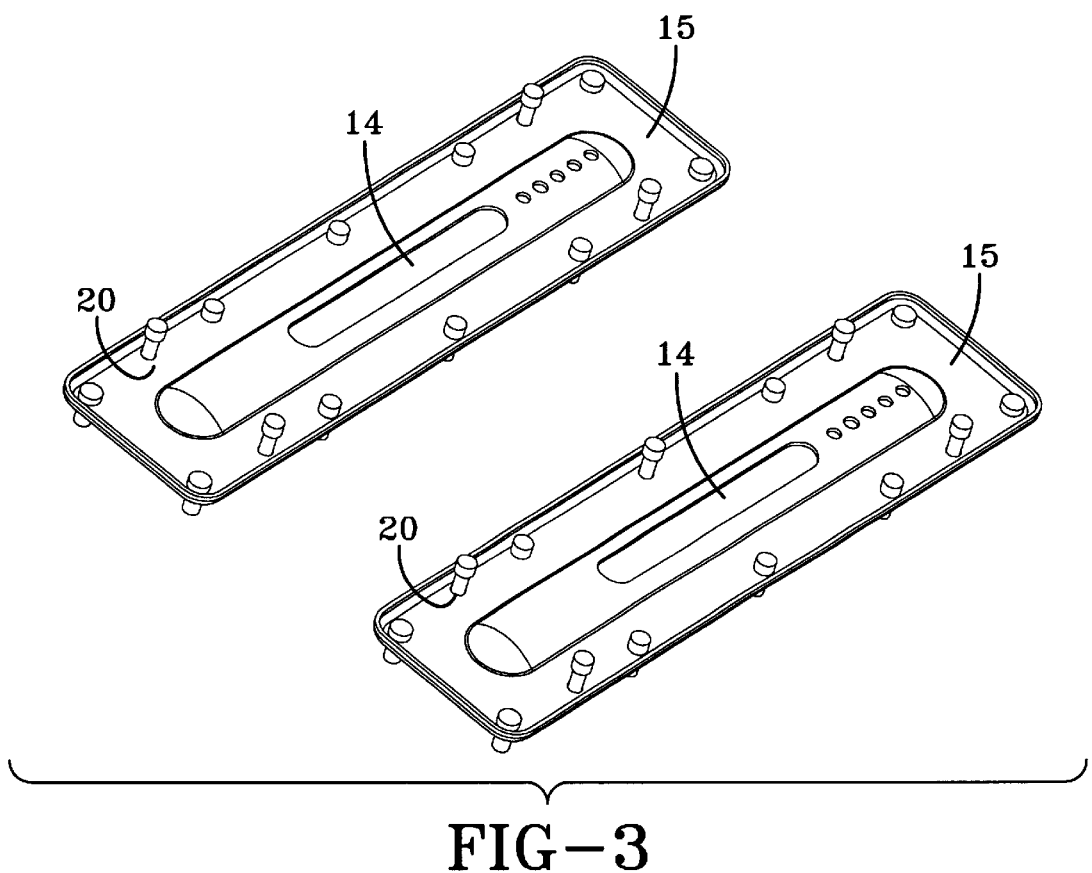
FIG. 3 is a perspective view of the two top plates.

The top plates 15 are shown in FIG. 3, and each of these plates has a long cut out section 14 for inflation gas to pass through during the filling of the airbag. Only inflation gas from one inflator travels through one top plate 15.

Figure 4:
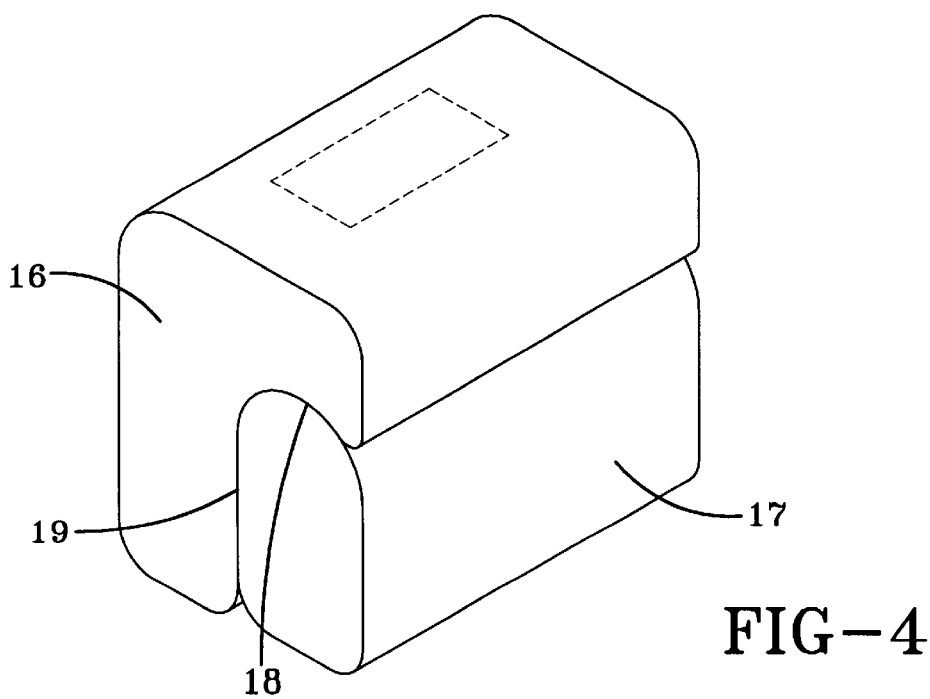
FIG. 4 is a perspective view of the inflated airbags.

FIG. 4 shows the two inflated airbags contemplated in the present invention. The first and second airbags are made of a suitable airbag material. Each airbag comprises an inflation chamber which is capable of receiving inflation gas upon deployment of the vehicle occupant protection system during a vehicle crash. The airbag material has a ventilation opening therein for venting inflation gas to provide a compliant airbag surface upon impact by a vehicle occupant. As used herein, the term "airbag material" is understood to mean any suitable coated or uncoated woven fabric as well as nonwoven films that may be used for an airbag.

The first airbag 16 has substantially an L shaped cross section in a deployed state and is larger in terms of volume than the second airbag. This L shape configuration will provide a large occupant contact area as well as cover the gap between the first and second airbags.

The second airbag 17 is disposed adjacent to the first airbag 16. When both airbags are fully deployed, there is substantially no gap between one side portion 18 and the top portion 19 of the second airbag 17 and the first airbag. The side portion 18 has a concave edge and this edge mates with a complimentary surface on the first airbag. One skilled in the art appreciates that the side portion of the second airbag 17 may have other curvilinear shapes as well as a flat shape. The first and second airbags are tacked together along the side portion 18 and top portion 19 of the second airbag 17. When both airbags are deployed, only the first airbag 16 contacts the occupant's torso during a crash.

The airbags are attached to the base plate 1 via the top plates 15. The top plates 15 are inserted into seperate airbags. The holes (not shown) of the top plates 15 are aligned with the holes of the airbag (not shown). Fasteners 20 are inserted through the holes in the top plates 15, the holes in the airbags, and then through the holes in the base plate 1. As oppose to the fasteners being inserted through the holes in the top plate 15, the fasteners may be permanently affixed to the top plate. Nuts are utilized to engage with the fasteners to secure them in place. Alternatively, the holes in the base plate 1 may be threaded eliminating the need for nuts.

The airbag module is designed to be versatile in nature to reduce injury to out of position occupants. The are three different deployment scenarios contemplated in the present invention. In the first deployment situation, only the first airbag is deployed; however, since the airbags are stitched to one another, the uninflated second airbag exits the airbag module with the first airbag. The uninflated second airbag does not interfere with the performance of the first airbag. In the second deployment scenario, only the second airbag is deployed to provide protection to the out of position children. In this deployment scenario, the first airbag does not inflate but still leaves the airbag module with the second airbag because the airbags are stitched to one another. The uninflated first airbag does not interfere with the performance of the second airbag. In the third deployment scenario, both of the airbags are deployed to afford maximum protection to a full size occupant.

In operation, the inflation gas exits the inflator 2 through the exit ports. The base plate 1 acts as a manifold in directing the inflation gas toward the airbags. The inflation gas passes through the cut out section 14 in the top plate 15 and ultimately travels into the airbag. Inflation gas from one of the inflators provides inflation gas for the first airbag, and the other inflator provides inflation gas for second airbag. The utilization of two separate top ensures that inflation gas from one inflator only flows into one of the airbags. Since the first airbag 16 has a larger volume than the first airbag, the inflator providing inflation gas needs to have a greater gas output than the other inflator.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. An airbag module comprising:

an inflator for providing inflation gas;

a base plate for receiving the inflator;

a first airbag having substantially a "L" cross section in a deployed state; and a second airbag in a deployed state adjacent to the deployed first airbag, the second airbag comprises a top potion and a side portion, wherein there is substantially no gap between the side portion and the top portion of the second airbag and the first airbag after the first and second airbags are fully deployed, wherein the inflated first amid second airbags cooperate such that only the first inflated airbag contacts a torso of an occupant during a crash.

2. The airbag module according to claim 1 wherein the base plate has an igniter access slot for receiving an endcap of the inflator.

3. The airbag module according to claim 1 further comprising a first retainer between an end cap of the inflator and the base plate and a second retainer between a bottom end of the inflator and the base plate to prevent the inflator from sliding in a recess of the base plate.

4. The airbag module according to claim 1 further comprising two top plates for securing the first and second airbags to the base plate, wherein the top plates are inserted into separate airbags.

5. The airbag module according to claim 1 wherein the inflated second airbag interacts with an occupant during a crash when only the second airbag is inflated.

6. The airbag module according to claim 1 wherein the first airbag is tacked to the top and side portions of the second airbag.

* * * * *